(12) United States Patent
Feather et al.

(10) Patent No.: US 8,086,221 B2
(45) Date of Patent: Dec. 27, 2011

(54) AUTHORIZING AN ENDPOINT NODE FOR A COMMUNICATION SERVICE

(75) Inventors: Arthur E. Feather, Monte Sereno, CA (US); John G. Waclawsky, Frederick, MD (US); Viren K. Malaviya, Cupertino, CA (US); Anand K. Oswal, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 306 days.

(21) Appl. No.: 12/408,884

(22) Filed: Mar. 23, 2009

(65) Prior Publication Data

US 2009/0183240 A1 Jul. 16, 2009

Related U.S. Application Data

(63) Continuation of application No. 11/290,307, filed on Nov. 29, 2005, now Pat. No. 7,508,794.

(51) Int. Cl.
*H04M 1/66* (2006.01)
*H04W 4/00* (2009.01)
*H04N 7/167* (2006.01)

(52) U.S. Cl. ...................... 455/411; 455/435.3; 380/229; 380/220

(58) Field of Classification Search ............... 455/435.1, 455/411, 435.3, 414.1, 500, 410, 407; 370/338; 380/220, 229

See application file for complete search history.

(56) References Cited

U.S. PATENT DOCUMENTS

| | | | |
|---|---|---|---|
| 6,226,511 B1 | 5/2001 | Jacobs et al. | 455/411 |
| 2005/0079869 A1* | 4/2005 | Khalil et al. | 455/435.1 |
| 2006/0209768 A1* | 9/2006 | Yan et al. | 370/338 |

OTHER PUBLICATIONS

M. Garcia-Martin, Input 3rd-Generation Partnership Project (3GPP), Release 5 Requirements on the Session Initiation Protocol (SIP), Network Working Group, Request for Comments: 4083, Category: Informational, http://rfc4083.x42.com/, 34 pages, May 2005.
White Paper: Steel-Belted Radius and the iPass NetServer 3.2, © 2005 Funk Software, Inc., http://www.funk.com/radius/Solns/ipass_wp.asp, 5 pages, Printed Aug. 8, 2005.
Introducing RADIUS 1, © 1999, Lucent Technologies, http://portmasters.com/www.livingston.com/tech/docs/radius/introducing.html, 9 pages, Printed Aug. 8, 2005.

* cited by examiner

*Primary Examiner* — Kiet Doan
(74) *Attorney, Agent, or Firm* — Baker Botts L.L.P.

(57) ABSTRACT

A network system for authorizing an endpoint node for a communication service includes an operator network and an organization network. The operator network operates to perform a device authorization operation to authorize the endpoint node for a communication session. The organization network operates to facilitate a service authorization operation to authorize the endpoint node for the communication service of the communication session.

19 Claims, 2 Drawing Sheets

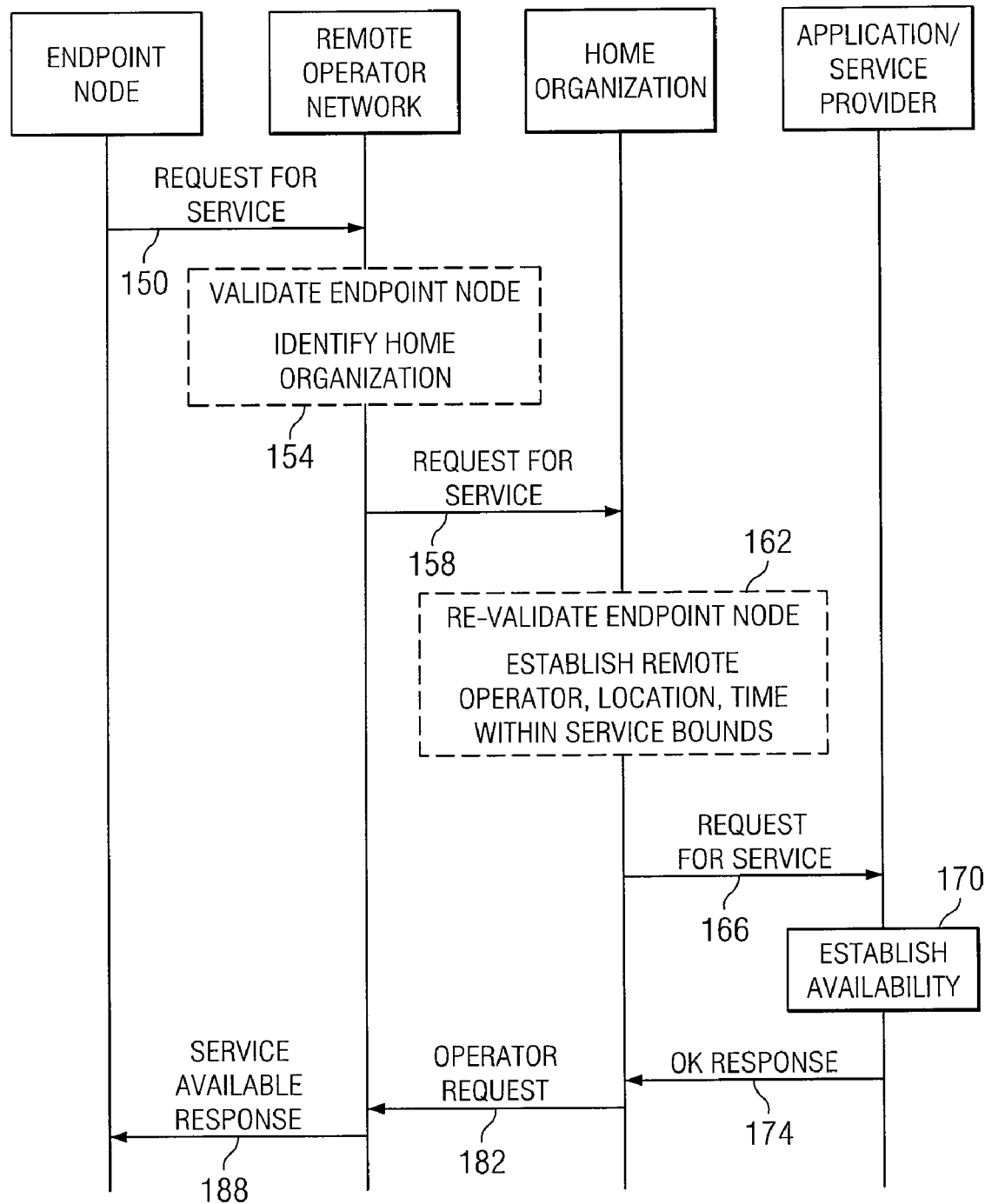

AUTHORIZING AN ENDPOINT NODE FOR A COMMUNICATION SERVICE

CROSS-REFERENCE TO RELATED APPLICATION

This application is a continuation of U.S. application Ser. No. 11/290,307 filed Nov. 29, 2005 and entitled "Authorizing an Endpoint Node for a Communication Service".

TECHNICAL FIELD

This invention relates generally to the field of telecommunications and more specifically to authorizing an endpoint node for a communication service.

BACKGROUND

An endpoint node may receive a communication service during a communication session. Typically, the endpoint node is required to be authorized for a service in order to receive the service. The service may be subject to certain conditions such as temporal restrictions defining when the service may be received.

Known techniques for authorizing an endpoint node for a service, however, typically do not provide for flexible authorization of the endpoint node in certain situations or for certain functions. It is generally desirable to have flexible techniques for authorizing an endpoint node for a service in certain situations.

SUMMARY OF THE DISCLOSURE

In accordance with the present invention, disadvantages and problems associated with previous techniques for authorizing an endpoint node for a communication service may be reduced or eliminated.

According to one embodiment of the present invention, a network system for authorizing an endpoint node for a communication service includes an operator network and an organization network. The operator network operates to perform a device authorization operation to authorize the endpoint node for a communication session. The organization network operates to facilitate a service authorization operation to authorize the endpoint node for the communication service of the communication session.

Certain embodiments of the invention may provide one or more technical advantages. A technical advantage of one embodiment may be that device authorization may be performed separately from service authorization. Performing device authorization separately from service authorization may provide for more flexible service authorization.

Another technical advantage of one embodiment may be that an operator network may perform device authorization, and may communicate with an organization network to perform service authorization. The organization network facilitates service authorization, which may allow the organization network to provide updated information to service authorization operations.

Yet another technical advantage of one embodiment may be that processing for device authentication or service authentication may be performed as a function of settings at the home, visited, or transit operator networks as well as at one or more responsible organizations. The responsible organizations may include parties delivering services or applications, parties responsible for payment of services delivered for the device holder, or parties providing device support.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 3 is a service flow diagram illustrating one embodiment of a method for transitioning an endpoint node between available networks.

DETAILED DESCRIPTION OF THE DRAWINGS

Figure 1:
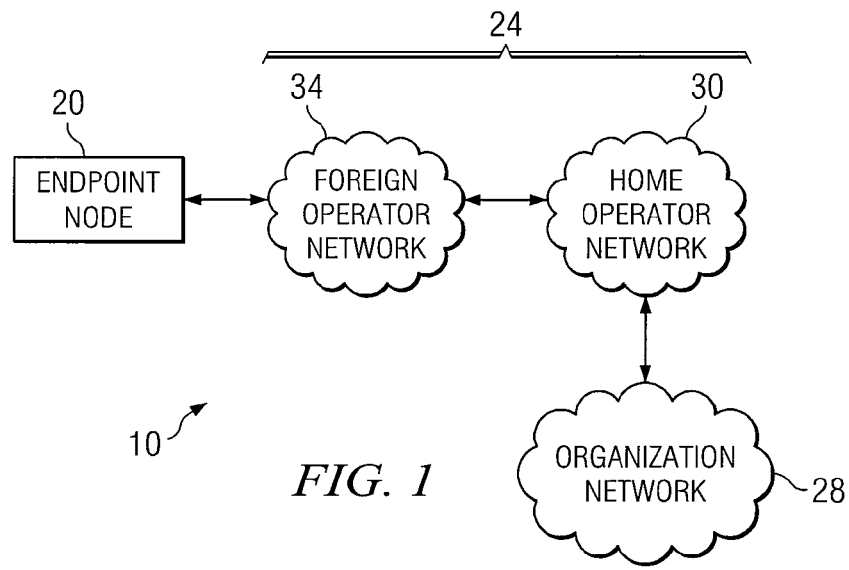
FIG. 1 is a block diagram illustrating one embodiment of a network system that performs device authorization separately from service authorization.
Figure 2:
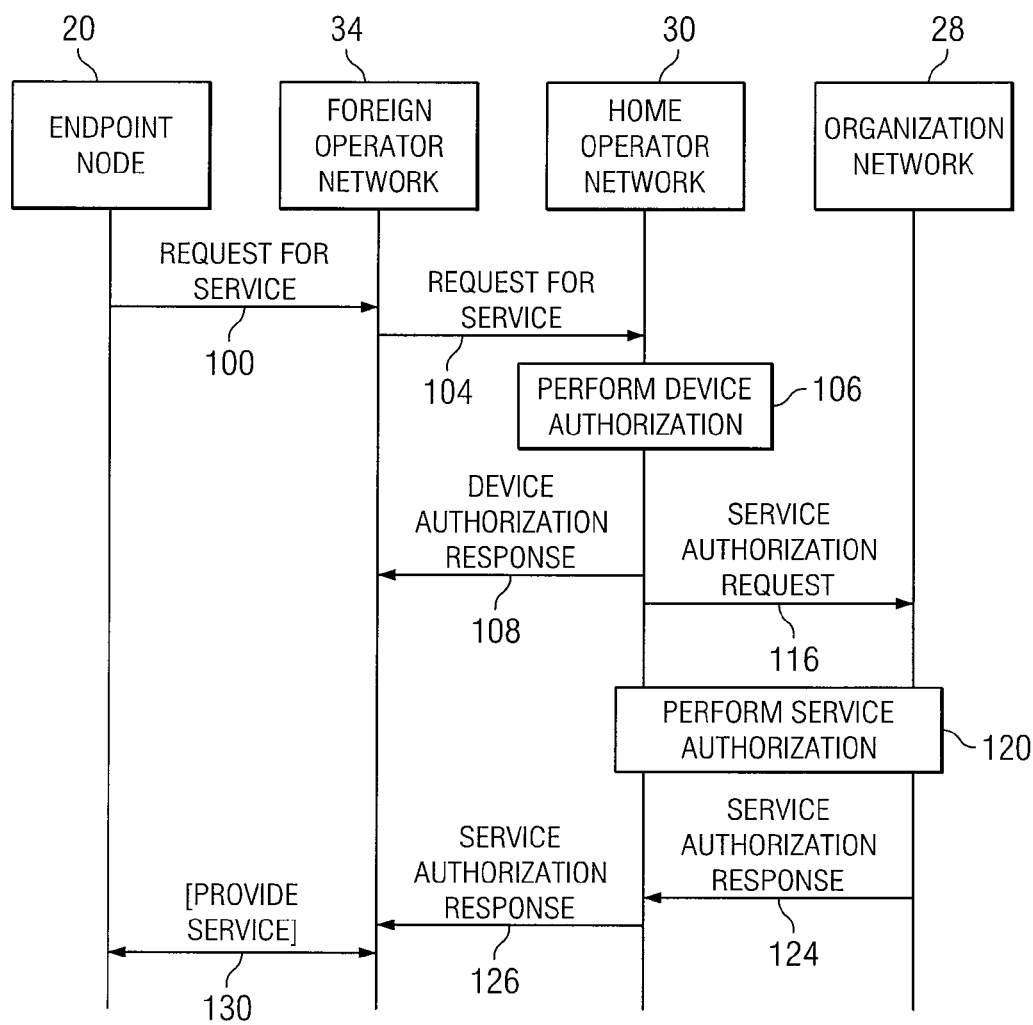
FIG. 2 is a call flow diagram illustrating one embodiment of method for authorizing an endpoint node of a service.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a network system 10 that performs device authorization separately from service authorization. According to the embodiment, an operator network is operable to communicate with an organization network. The operator network may perform device authorization, and may communicate with the organization network to perform service authorization.

According to the embodiment, system 10 operates to provide communication sessions to endpoints such as endpoint node 20. A communication session may refer to an active communication between endpoints, measured from endpoint to endpoint. A communication session may be used to provide a communication service to endpoint node 20. A communication service may refer to a service that is provided by a service provider to endpoint node 20 under predetermined conditions.

Information is communicated during a communication session. Information may refer to voice, data, text, audio, video, multimedia, web page, control, signaling, other information, or any combination of the preceding. Information may be communicated in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets.

Session parameters describe features of communication sessions, such as the networks and services involved in communication sessions, and a particular communication session may have specific session parameter values for the session parameters. As an example, a session parameter value of a communication session may comprise an identifier of an endpoint node 20 of the communication session. Session rules may be applied to session parameter values to perform operations. As an example, an authentication rule may be applied to the identifier of endpoint node 20 to authenticate endpoint node 20.

Session parameters and session rules may be used to perform specific operations, such as authorization, provisioning, billing, or other operation. The session parameters and rules may be categorized in a hierarchy according to the operations that they may be used to perform. For example, session parameters and rules may be organized into authorization and provisioning categories. Certain networks of system 10 may use a particular category to perform specific operations. For example, an operator network may use an authorization category to perform authorization.

According to one embodiment, the categories may include device authorization and service authorization categories, which both include session parameters and rules that may be used to perform authorization-related operations. Authorization-related operations may include services for authentication, authorization, accounting, charging, or any suitable combination of the preceding. Authentication may refer to validating the identity of endpoint node 20. Authorization may refer to authorizing a service for endpoint node 20. Accounting may refer to tracking the usage of resources. Charging may refer to designating the billing unit or the party to be billed. As an example, an authorization server may provide one, two, three, or four of the listed operations.

According to the embodiment, device authorization may refer to authorizing endpoint node 20 for a communication session. The device authorization category includes device authorization parameters and rules that may be used to authorize endpoint node 20 for a communication session. For example, the device authorization parameters may include an identifier and a passcode for endpoint node 20, and the rules may match the identifier and passcode to a database to authenticate endpoint node 20.

Service authorization may refer to authorizing endpoint node 20 for a communication service. The service authorization category includes service authorization parameters and rules that may be used to authorize endpoint node 20 for a communication service. The parameters and rules may be used to specify the conditions under which a service provider provides a service to endpoint node 20. A given service may have specific parameter values for the parameters.

Service authorization parameters may describe features of a service such as access to the service, networks supporting the service, type of service, other aspect, or any suitable combination of the preceding. Access parameters may be used to determine whether endpoint node 20 is permitted access to a service. Example access parameters may include: the time when endpoint node 20 is requesting service; the location of endpoint node 20; the networks providing the service to endpoint node 20; the citizenship or employee status of a user of endpoint node 20; one or more other parameters that describe the conditions under which endpoint node 20 is permitted access to a service; or any combination of the preceding. Additional parameters may include capabilities of endpoint node 20, for example: the ability of endpoint node 20 to support secured communications; the network communications technologies supported by endpoint node 20; and the organization authority responsible for endpoint node 20.

Support network parameters may be used to select a network to support a service. Example support network parameters may include: the cost of a network to support a service; the location of the network with respect to the location of endpoint node 20; the currency of payment for use of a network; the capability of a network to provide a service; one or more other parameters that may be used to select a network to support a service; or any combination of the preceding. Parameters covered by this list may include: the available quality of service (including bandwidth, prioritization capabilities, reliability, latency, and delay); the security or encryption capabilities of the network; the billing rates for units of service on the network; other network-related conditions, or any combination of the preceding.

Service type parameters may be used to describe the type of service provided to endpoint node 20. As a first example, a source parameter may describe the source of a service, and may be given as a Universal Resource Identifier (URI). As a second example, a capability parameter may describe the capability provided by the service, for example, web browsing, electronic mail, or other service. As a third example, an information type parameter may describe the type of information communicated by a service, for example, data, voice, or other type of information. As a fourth example, a billing parameter may describe how endpoint node 20 is to be charged for a service.

As a fifth example, a service level parameter may describe a level of service according to which the service provider has agreed to provide to endpoint node 20. Example service level parameters may describe bandwidth, availability, response, delivery, or other aspect of a service. Example bandwidth constraints may include a guaranteed bandwidth. Example availability constraints may include an average availability, an average or maximum restoration time, and an average or maximum period of outage. Example response constraints may include an average or maximum delay, an average or maximum response time, and an average or maximum latency. Example delivery constraints may include an average or minimum data rate.

Service level parameters may describe a service classification. Examples of service classes may include: basic communication with best-effort transport useful for background communication; services used for the purchase of goods billed to the telecommunications node; services for the purposes of wagering and gambling; services designed for adult users, including content or two-way communication; travel-related services that specify access to information local to the present location of endpoint node 20, information for the home location of endpoint node 20, or global-based information defined by the organization responsible for endpoint node 20.

System 10 includes components such as devices. In general, a device may include any suitable arrangement of components operable to perform the operations of the device. As an example, a device may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

The devices of system 10 may utilize communication protocols and technologies to provide the communication sessions. Example communication protocols and technologies include those set by the Institute of Electrical and Electronics Engineers, Inc. (IEEE) 802.xx standards such as 802.11 and 802.16 standards, International Telecommunications Union (ITU-T) standards, European Telecommunications Standards Institute (ETSI) standards, Internet Engineering Task Force (IETF) standards, or other standards. According to one embodiment, system 10 may operate according to the IP Multimedia Subsystem (IMS) standards as defined by the 3G Partner Project (3GPP).

According to the illustrated embodiment, system 10 includes endpoint node 20, operators 24, and an organization network 28. Endpoint node 20 represents any suitable device operable to communicate with system 10. Endpoint node 20 may comprise, for example, a personal digital assistant, a computer such as a laptop, a cellular telephone, a mobile handset, or any other device operable to communicate with system 10. Endpoint node 20 may have an endpoint node identifier that uniquely identifies endpoint node 20. An endpoint node identifier may comprise, for example, a medium access control (MAC) address, an Internet Protocol (IP) address, a telephone number, other identifier that uniquely identifies endpoint node 20, or any combination of the preceding.

An operator network 24 may represent a network that is operated by one or more operators. A network may refer to a communication network that allows devices such as endpoint node 20 to communicate with other devices. A communication network may comprise all or a portion of a public switched telephone network (PSTN), a public or private data network, a local area network (LAN), a metropolitan area network (MAN), a wide area network (WAN), a local, regional, or global communication or computer network such as the Internet, a wireline, optical, or wireless network, an enterprise intranet, other suitable communication link, or any combination of the preceding.

An operator for an operator network 24 may provide operator network 24 to support communication sessions for endpoint node 20, typically in exchange for compensation. An operator network 24 may include any suitable device for supporting communication sessions. As a first example, an operator network 24 may include a cell site. A cell site may refer to an access point that provides wireless services to endpoint node 20 present in, or visiting, a cell of the cell site. An access point may refer to a network point that couples a wireless network, such as a wireless radio network, to a wired network, such as a wired area network.

As a second example, an operator network 24 may include a gateway. A gateway represents any suitable device operable to interconnect one network with another network. A gateway may convert communications between different communication protocols. For example, a gateway may convert communications from a protocol used by one network to a different protocol used by another network, or vice-versa. As a third example, an operator network 24 may include an authorization server. An authorization server may represent any suitable device operable to provide authorization-related operations.

According to the illustrated embodiment, operator networks 24 include a home operator network 30 and a foreign operator network 34. Home operator network 30 may include a home agent. A home agent of endpoint node 20 may refer to an agent that maintains the address of endpoint node 20 and forwards data to endpoint node 20. Foreign operator network 34 may include a foreign agent. A foreign agent of endpoint node 20 may refer to an agent that provides the home agent of endpoint node 20 with an address to which data for endpoint node 20 may be forwarded.

An organization network 28 may represent a communication network of an organization. An organization may refer to entity comprising people, property, and other assets, or any suitable combination of the preceding. Examples of organizations include companies, universities, government bodies, users, independent entities, or any suitable combination of the preceding.

According to one embodiment, one or more networks of system 10 may perform authorization-related operations to provide a service to endpoint node 20. According to the embodiment, a first network may apply device authorization rules to device authorization parameter values to perform device authorization, and a second network may apply service authorization rules to service authorization parameter values to perform service authorization.

As a first example, home operator network 30 may perform the device authorization, and organization network 28 may perform the service authorization. As a second example, home operator network 30 may perform the device authorization, and home operator network 30 may receive information from organization network 28 to perform the service authorization. In these examples, home operator network 30 and organization network 28 may communicate in real time such that home operator network 30 may obtain service authorization information from organization network 28. Any suitable networks or combination of networks, however, may perform any suitable authorization-related operations. Moreover, any suitable device of the networks, such edge or gateway platforms, may perform the authorization-related operations.

According to one embodiment, networks may have a secure link that may be used to securely communicate messages, such as authentication request messages, between the networks. The secure link may be substantially permanent or may be dynamically provided. As an example, a secure link may be provided between home operator network 30 and the authentication servers of organization network 28. As another example, a secure link may be provided between organization network 28 and other applications and service providers.

For convenience or other reason, devices installed and maintained in the operator network 28 may be used to contain the authorization-related rules that may be designated by the party responsible for endpoint node 20. Operator and organization authorization information may be combined in a single device, and the information may be logically separated to provide the same functionality.

Modifications, additions, or omissions may be made to system 10 without departing from the scope of the invention. The components of system 10 may be integrated or separated according to particular needs. Moreover, the operations of system 10 may be performed by more, fewer, or other modules. Additionally, operations of system 10 may be performed using any suitable logic. As used in this document, "each" refers to each member of a set or each member of a subset of a set.

FIG. 2 is a call flow diagram illustrating one embodiment of method for authorizing an endpoint node for a service. The method may be performed with any suitable network system, for example, network system 10 of FIG. 1.

The method begins at step 100, where endpoint node 20 sends a request for service to foreign operator network 34. The request may include session parameter values such as device authorization parameter values and service authorization parameter values. Foreign operator network 34 forwards the request for service to home operator network 30 at step 104.

Home operator network 30 performs a device authorization operation to authorize endpoint node 20 for a communication session at step 106. Home operator network 30 may apply device authorization rules to the device authorization parameter values to perform the device authorization operation. Home operator network 30 sends a device authorization response to foreign operator network 34 at step 108. The device authorization response indicates whether endpoint node 20 is authorized for the communication session.

A service authorization operation is performed at steps 120 and 124. According to one embodiment, home operator network 30 sends a service authorization request to organization network 28 at step 116. The service authorization request may include the service authorization parameter values. Organization network 28 performs a service authorization operation to authorize endpoint node 20 for a communication service at step 120. Organization network 28 may apply service authorization rules to the service authorization parameter values to perform the service authorization operation. Organization network sends a service authorization response to home operator network at step 124. The service authorization response indicates whether endpoint node 20 is authorized for the service.

According to another embodiment, home operator network 30 sends a service authorization request to organization network 28 at step 116. The service authorization request may include a request for service authorization parameter values. Organization network sends the service authorization parameter values to home operator network 30. Home operator network 30 performs a service authorization operation to authorize endpoint node 20 for a communication service at step 120. Home operator network 30 may apply service authorization rules to the service authorization parameter values to perform the service authorization operation.

Home operator network 30 sends the service authorization response to foreign operator network at step 126. The service is provided to endpoint node at step 130. After providing the service, the method terminates.

Modifications, additions, or omissions may be made to the method without departing from the scope of the invention. The method may include more, fewer, or other steps. Additionally, steps may be performed in any suitable order without departing from the scope of the invention.

FIG. 3 is a service flow diagram illustrating one embodiment of a method for transitioning an endpoint node between networks. The method may be performed with any suitable network system, for example, network system 10 of FIG. 1.

The method begins at step 150, where an endpoint node sends a request for service to a remote operator network. The request may comprise a request for application service provider (ASP) request, and may include session parameter values such as device authorization parameter values, for example, the location of the endpoint node.

The remote operator network performs a device authorization operation to authorize the endpoint node for a communication session at step 154. The remote operator network may validate the endpoint node and identify the home organization for the endpoint node. The remote operator network may also append a remote operator identifier and the time to the request for service, and forward the request for service to the home organization at step 158.

The home organization performs a service authorization operation to authorize the endpoint node for the service at step 162. The home organization may re-validate the endpoint node, and establish that the remote operator, location, and time satisfy the service authorization rules. The remote operator network may also append account and billing detail to the request for service, and forward the request for service to the application service provider at step 166.

The application service provider establishes service availability at step 170. The application service provider sends an OK response to the home organization at step 174. The home organization requests that the remote operator provide the service under specified bandwidth, delay, and billing conditions at step 182. The remote operator validates the request, and sends a service available response to the endpoint node at step 188. The remote operator provides the service as specified by the service parameter values.

According to one embodiment, subsequent validations are performed when conditions of the service change. Example condition changes include changes in the movement of the endpoint node, the operator providing the connection for the endpoint node, or the bandwidth and latency service level conditions of the connection. The endpoint node may be notified of the new conditions by any of the other nodes. During a subsequent validation, the endpoint node sends a request for service that includes the new conditions. The method may then be repeated to validate the endpoint node for service under the new conditions.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that device authorization may be performed separately from service authorization. Performing device authorization separately from service authorization may provide for more flexible service authorization.

Another technical advantage of one embodiment may be that an operator network may perform device authorization, and may communicate with an organization network to perform service authorization. The organization network facilitates service authorization, which may allow the organization network to provide updated information to service authorization operations.

Yet another technical advantage of one embodiment may be that processing for device authentication or service authentication may be performed as a function of settings at the home, visited, or transit operator networks as well as at one or more responsible organizations. The responsible organizations may include parties delivering services or applications, parties responsible for payment of services delivered for the device holder, or parties providing device support.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method comprising:
receiving, at an organization network, a service authorization request from a home operator network, the service authorization request requesting authorization for a communication service for an endpoint node, the service authorization request comprising one or more service authorization parameter values, the one or more service authorization parameter values comprising one or more encryption capabilities of the organizational network, the home operator network maintaining an address of the endpoint node to forward data to the endpoint node, the organization node distinct from the home operator network;

determining, by the organization network, whether the endpoint node is authorized for the communication service by applying one or more service authorization rules to the service authorization parameter values including the one or more encryption capabilities of the organizational network; and sending a service authorization response from the organization network to the home operator network, the service authorization response indicating whether the endpoint node is authorized for the communication service.

2. The method of claim 1, the home operator network configured to authorize the endpoint node for the communication session.

3. The method of claim 1:
the service authorization parameter values comprising the time when the endpoint node is requesting service; and
the determining, by the organization network, whether the endpoint node is authorized for the communication service further comprising:
applying the one or more service authorization rules to the time when the endpoint node is requesting service.

4. The method of claim 1:
the service authorization parameter values comprising the location of the endpoint node; and
the determining, by the organization network, whether the endpoint node is authorized for the communication service further comprising:
applying the one or more service authorization rules to the location of the endpoint node.

5. The method of claim 1:
the service authorization parameter values comprising an employee status of a user of endpoint node; and
the determining, by the organization network, whether the endpoint node is authorized for the communication service further comprising:
applying the one or more service authorization rules to the employee status of the user of endpoint node.

6. The method of claim 1:
the service authorization parameter values comprising an ability of the endpoint node to support secured communications values; and
the determining, by the organization network, whether the endpoint node is authorized for the communication service further comprising:
applying the one or more service authorization rules to the ability of the endpoint node to support secured communications.

7. The method of claim 1:
the service authorization parameter values comprising a cost of the organizational network to support the communication service; and
the determining, by the organization network, whether the endpoint node is authorized for the communication service further comprising:
applying the one or more service authorization rules to the cost of the organizational network to support the communication service.

8. The method of claim 1:
the service authorization parameter values comprising the location of the organizational network with respect to the location of the endpoint node; and
the determining, by the organization network, whether the endpoint node is authorized for the communication service further comprising:
applying the one or more service authorization rules to the location of the organizational network with respect to the location of the endpoint node.

9. The method of claim 1, the service authorization request received by the organization network from the home operator network after the home operator network has sent a device authorization response to a foreign operator network indicating that the endpoint node is authorized for a communication session.

10. An apparatus comprising:
an interface configured to:
receive a service authorization request from a home operator network, the service authorization request requesting authorization for a communication service for an endpoint node, the service authorization request comprising one or more service authorization parameter values, the one or more service authorization parameter values comprising one or more encryption capabilities of the organizational network, the home operator network maintaining an address of the endpoint node to forward data to the endpoint node, the organization node distinct from the home operator network; and
a processor configured to:
determine whether the endpoint node is authorized for the communication service by applying one or more service authorization rules to the service authorization parameter values including the one or more encryption capabilities of the organizational network; and
send a service authorization response from the organization network to the home operator network, the service authorization response indicating whether the endpoint node is authorized for the communication service.

11. The apparatus of claim 10, the home operator network configured to authorize the endpoint node for the communication session.

12. The apparatus of claim 10:
the service authorization parameter values comprising the time when the endpoint node is requesting service; and
the processor further configured to determine whether the endpoint node is authorized for the communication service by:
applying the one or more service authorization rules to the time when the endpoint node is requesting service.

13. The apparatus of claim 10:
the service authorization parameter values comprising the location of the endpoint node; and
the processor further configured to determine whether the endpoint node is authorized for the communication service by:
applying the one or more service authorization rules to the location of the endpoint node.

14. The apparatus of claim 10:
the service authorization parameter values comprising an employee status of a user of endpoint node; and
the processor further configured to determine whether the endpoint node is authorized for the communication service by:
applying the one or more service authorization rules to the employee status of the user of endpoint node.

15. The apparatus of claim 10:
the service authorization parameter values comprising an ability of the endpoint node to support secured communications values; and
the processor further configured to determine whether the endpoint node is authorized for the communication service by:

applying the one or more service authorization rules to the ability of the endpoint node to support secured communications.

16. The apparatus of claim 10:
the service authorization parameter values comprising a cost of the organizational network to support the communication service; and
the processor further configured to determine whether the endpoint node is authorized for the communication service by:
applying the one or more service authorization rules to the cost of the organizational network to support the communication service.

17. The apparatus of claim 10:
the service authorization parameter values comprising the location of the organizational network with respect to the location of the endpoint node; and
the processor further configured to determine whether the endpoint node is authorized for the communication service by:
applying the one or more service authorization rules to the location of the organizational network with respect to the location of the endpoint node.

18. A method comprising:
receiving, at an organization network, a service authorization request from a home operator network, the service authorization request requesting authorization for a communication service for an endpoint node, the service authorization request comprising one or more service authorization parameter values, the service authorization parameter values comprising one or more encryption capabilities of the organizational network, the time when the endpoint node is requesting service, and the location of the endpoint node, the home operator network maintaining an address of the endpoint node to forward data to the endpoint node, the organization node distinct from the home operator network;
determining, by the organization network, whether the endpoint node is authorized for the communication service by applying one or more service authorization rules to the one or more encryption capabilities of the organizational network, the time when the endpoint node is requesting service, and the location of the endpoint node; and
sending a service authorization response from the organization network to the home operator network, the service authorization response indicating whether the endpoint node is authorized for the communication service.

19. The method of claim 18:
the service authorization parameter values comprising the location of the organizational network with respect to the location of the endpoint node; and
the determining, by the organization network, whether the endpoint node is authorized for the communication service further comprising:
applying the one or more service authorization rules to the location of the organizational network with respect to the location of the endpoint node.

* * * * *